US012163387B1

(12) United States Patent
Alfaiz et al.

(10) Patent No.: US 12,163,387 B1
(45) Date of Patent: Dec. 10, 2024

(54) METHODS FOR REDUCING THE SIZE OF CUTTINGS IN OIL AND GAS DRILLING OPERATIONS

(71) Applicant: Saudi Arabian Oil Company, Dhahran (SA)

(72) Inventors: Abdulrahman Alfaiz, Dammam (SA); Amer Alharthi, Dammam (SA); Naif Alnefaie, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/473,807

(22) Filed: Sep. 25, 2023

(51) Int. Cl.
*E21B 21/06* (2006.01)
*B02C 13/286* (2006.01)

(52) U.S. Cl.
CPC .......... *E21B 21/066* (2013.01); *B02C 13/286* (2013.01); *B02C 2013/28609* (2013.01); *B02C 2013/28618* (2013.01)

(58) Field of Classification Search
CPC ................ E21B 21/066; B02C 13/286; B02C 2013/28609; B02C 2013/28618
See application file for complete search history.

(56) References Cited

U.S. PATENT DOCUMENTS 2,750,123 A * 6/1956 Keiper .................... B02C 23/00 241/27
4,361,290 A * 11/1982 Francis ................. B02C 13/286 241/189.1
4,434,028 A * 2/1984 Eppig ................... E21B 41/005 202/168
5,090,498 A * 2/1992 Hamill ................... B01D 36/04 175/207
5,381,971 A 1/1995 Rehmer
5,743,472 A 4/1998 Williams, Jr. et al.
7,398,839 B2 * 7/2008 Harder .................. E21B 21/063 175/54
2004/0035967 A1 * 2/2004 Johnson .................. B02C 2/005 241/207
2016/0045841 A1 * 2/2016 Kaplan ................... C01B 32/05 429/49
2019/0301253 A1 * 10/2019 Mallonee ............. E21B 21/068

* cited by examiner

*Primary Examiner* — Shane Bomar
(74) *Attorney, Agent, or Firm* — DINSMORE & SHOHL LLP

(57) ABSTRACT

A method of reducing the size of cuttings to fine particles includes obtaining a mixture comprising at least cuttings and drilling fluid and providing a crushing machine including an inlet and a first stage. The first stage includes a first housing, a first rotating hammer with a plurality of blades disposed within the first housing that spins on an axis powered by a motor, a first grate plate, a first water injector coupled to the first housing, and a second stage that is substantially similar to the first stage. The method further includes crushing the cuttings with the first rotating hammer to form reduced-size cuttings and injecting water into the first housing via the first water injector, thereby flowing crushed cuttings through toward the second stage. The method is repeated in the second stage such that the reduced size cuttings become fine particles and flow into a waste pit.

13 Claims, 5 Drawing Sheets

METHODS FOR REDUCING THE SIZE OF CUTTINGS IN OIL AND GAS DRILLING OPERATIONS

TECHNICAL FIELD

The present disclosure relates to oil and gas drilling and, more specifically, to the size-reduction of rock cuttings.

BACKGROUND

During drilling operations, the drilling fluid or mud is a crucial component used to facilitate the drilling process in oil and gas exploration. This fluid serves various purposes, including cooling and lubricating the drill bit, carrying rock cuttings to the surface, maintaining pressure in the wellbore, and preventing formation fluids from entering the well. As drilling progresses, the drilling fluid, now laden with rock cuttings and potentially other materials, returns to the surface through the annulus between the drill pipe and the wellbore. Generally, this returning drilling fluid is then separated from the rock cuttings and contaminants using a settling pit or equipment at the surface, allowing the fluid to be recycled and reused in subsequent drilling operations. Upon completion of a well, the contents of the settling pit may be vacuumed into trucks and hauled away. The rock cuttings may be too large to be effectively vacuumed and generally must be disposed of in a proper but costly way. Therefore, the development of new systems and processes for reducing the size of the rock cuttings such that the rock cuttings can be removed with the waste fluid are needed.

SUMMARY

Described herein are processes for reducing the size of rock cuttings, hereinafter "cuttings," such as those from an oil and gas drilling operation. In the embodiments described herein, drilling fluid and cuttings produced from oil and gas drilling operations undergo a separation process to at least partially separate the cuttings. Following this initial separation, the cuttings are fed into a two-stage crushing machine where each stage comprises a rotating hammer with a plurality of blades and a grate plate. Water is injected into each stage to move the cuttings along the crushing machine as the rotating blades reduce the size of the cuttings in each stage against a grate plate. As is described herein, the utilization of a two-stage crushing machine may serve to reduce the size of the cuttings to fine particles, such that the fine particles can be flowed to a waste pit and transferred to a vacuum tanker for treatment, reducing the need for a separate disposal process of the cuttings.

According to one or more embodiments described here, a method of reducing the size of cuttings from a drilling operation to fine particles, may include obtaining a mixture, the mixture comprising at least cuttings and drilling fluid; separating cuttings from the mixture to form a feed such that the feed comprises a greater ratio of cuttings to drilling fluid in comparison to the mixture; and providing a crushing machine. The crushing machine may include an inlet, a first stage and a second stage. The first stage may include: a first housing; a first rotating hammer disposed within the first housing, the first rotating hammer comprising a plurality of blades, wherein the first rotating hammer spins on an axis powered by a motor; a first grate plate affixed to the first housing; and a first water injector coupled to the first housing. The second stage may include: a second housing; a second rotating hammer disposed within the second housing, the second rotating hammer comprising a plurality of blades, wherein the second rotating hammer spins on an axis powered by the motor; a second grate plate affixed to the second housing; and a second water injector coupled to the second housing. The method may further include delivering the feed to the inlet, wherein the inlet comprises a channel coupled to the first stage and a mesh. The method may further include draining at least a portion of the drilling fluid from the feed through the mesh and delivering the drained drilling fluid to a mud tank; delivering the cuttings to the first stage of the crushing machine through the channel; crushing the cuttings with the first rotating hammer to form reduced-size cuttings; injecting water into the first housing via the first water injector thereby flowing the reduced-size cuttings through the first grate plate toward the second stage of the crushing machine; crushing the reduced size cuttings with the second rotating hammer such that the reduced size cuttings are further reduced in size to become fine particles; injecting water into the second housing through the second water injector to cause the fine particles to flow through an outlet; and flowing the fine particles to a waste pit.

These and other embodiments are described in more detail in the Detailed Description. It is to be understood that both the foregoing general description and the following detailed description present embodiments of the described technology, and are intended to provide an overview or framework for understanding the nature and character of the described technology as it is claimed. The accompanying drawing is included to provide a further understanding of the described technology and are incorporated into and constitute a part of this specification. The drawing illustrates various embodiments and, together with the description, serve to explain the principles and operations of the described technology. Additionally, the drawing and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawing, where like structure is indicated with like reference numerals and wherein.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
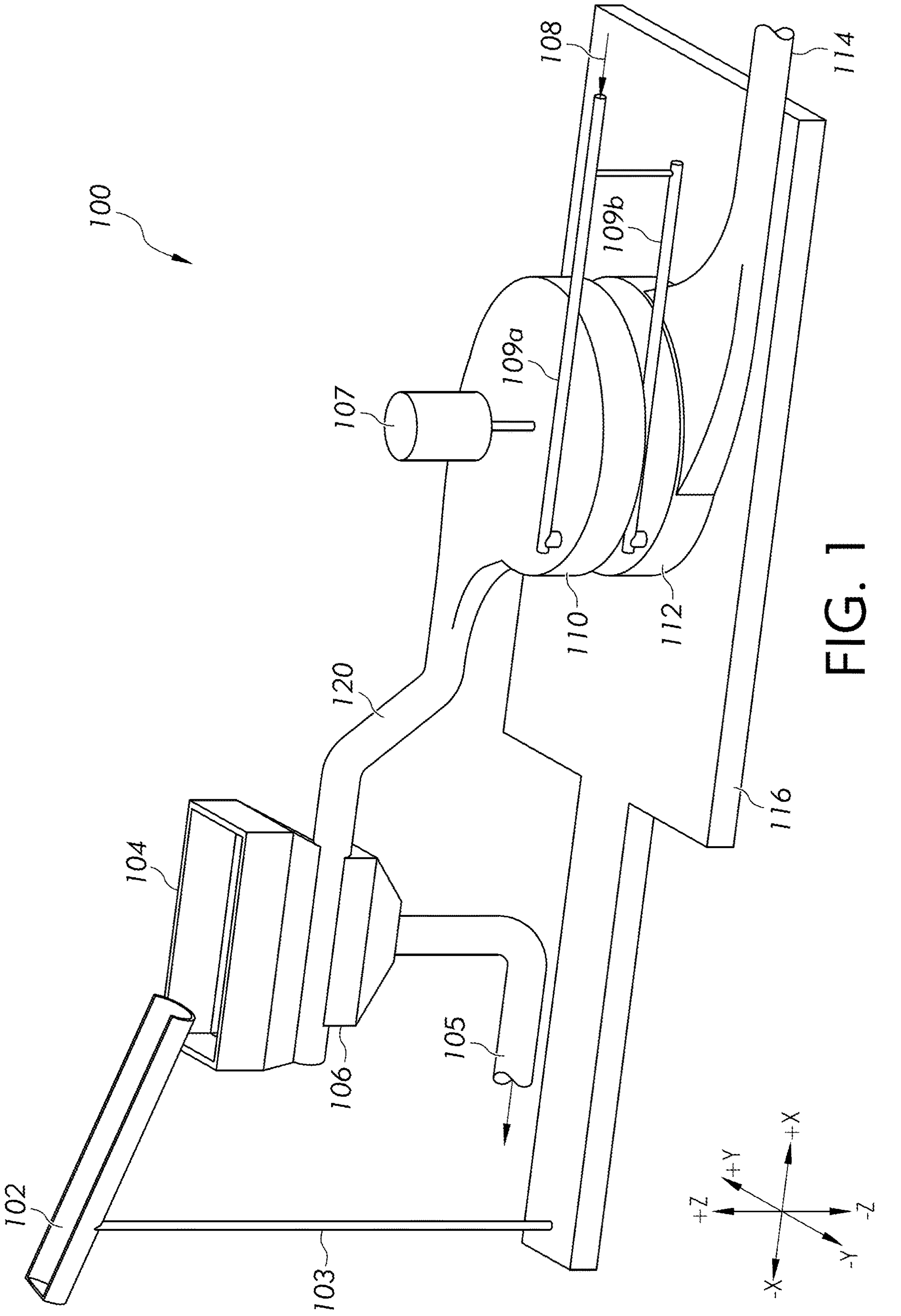
FIG. 1 schematically depicts an isometric view of a two-stage crushing machine, according to one or more embodiments herein.

Oil and gas drilling is the process of extracting petroleum resources from deep beneath the Earth's surface. The drilling process employs specialized drilling equipment and techniques to penetrate layers of rock and, once a well is established, oil and gas can be extracted and brought to the surface for further processing and distribution. As a drill bit operates, it drills into and breaks apart rock formations, creating cuttings. These cuttings are then brought to the surface along with drilling mud or drilling fluid, a specialized fluid used to lubricate the drill bit and carry the cuttings back to the surface. While cuttings provide valuable geological information about the formations being drilled through, they must be managed properly through some kind of disposal system. The logistics of disposing of the cuttings created during drilling may be costly and/or time-consuming.

According to one or more embodiments, cuttings from a drilling operation may be reduced in size to fine particles. As described herein, the cuttings may first be separated from a mixture. A crushing machine with two stages of rotating hammers is then provided to reduce the cuttings in size. Then, the fine particles may be deposited into a waste pit to be vacuumed with waste fluid and hauled away for treatment or recycling. These embodiments, as well as others, are described hereinbelow in detail.

As used throughout this disclosure, "cuttings" pertain to fragmented rock particles and debris generated during drilling operations. These cuttings are a byproduct of the drilling process, produced as a drilling bit penetrates geological formations.

As used throughout this disclosure, "fine particles" refers to cuttings after the cuttings have been crushed by a crushing machine, reducing their size to particles from about 80% to 90%.

As used throughout this disclosure, "drilling fluid" is a specialized fluid used in various drilling operations, particularly in oil and gas exploration and well construction. Drilling fluid may also be referred to as "mud" or "drilling mud". It serves multiple functions, including cooling and lubricating the drill bit, carrying cuttings to the surface, providing hydrostatic pressure to prevent formation fluids from entering the wellbore, and stabilizing the well walls to prevent collapse. Drilling fluids are formulated with a combination of base fluids, additives, and chemicals to achieve specific properties such as viscosity, density, and filtration control. These properties ensure efficient drilling, wellbore integrity, and the extraction of valuable geological information while minimizing environmental impact and optimizing drilling performance. For example, the drilling fluid may contain sodium, barium sulfate, and calcium. These components of the drilling fluid are used for density control, clay and shale stabilization, fluid rheology, and other suspension properties. Recovery of these components is an additional way to manage costs regarding disposal.

As used throughout this disclosure, a "mud tank" refers to a holding tank for drilling fluid or mud to be retrieved for treatment after separation from cuttings and other waste.

As used throughout this disclosure, a "waste pit" is a tank or pit where cuttings and/or fine particles and fluids are deposited to be retrieved for disposal or treatment.

As used throughout this disclosure, a "shaker" is a mechanical device designed to separate larger cuttings from smaller ones in a mixture of at least drilling fluid and cuttings. The shaker accomplishes this separation by using screens with varying mesh sizes. As the mixture flows over the shaker screens, the larger cuttings are retained on the top surface of a screen, while the smaller particles and drilling fluid pass through the mesh openings. The drilling fluid and smaller particles are routed to the mud tank for eventual treatment.

As used throughout this disclosure, a "rotating hammer" is a mechanical tool or device designed to deliver repetitive impact or striking forces through rotational motion. The rotating hammer may consists of a shaft attached to a head with a blade, or plurality of blades. Each blade acts as a striking surface.

As used throughout this disclosure, a "grate plate" is a flat or curved metal or composite element having a surface with openings or holes, often in a grid pattern. The grate plate allows the passage of certain materials while blocking others.

It should be understood that separation processes described in this disclosure may not completely separate all of one constituent from all of another constituent. It should be understood that the separation processes described in this disclosure "at least partially" separate different components from one another, and that even if not explicitly stated, it should be understood that separation may include only partial separation.

Now referring to FIG. 1, in one or more embodiments, a crushing machine 100 for reduction of cutting size includes a channel 102 that is in fluid communication with a shaker (FIG. 4) or other device for at least partially separating cuttings from drilling fluid. The channel 102 may be a passage or conduit specifically designed to deliver raw materials such as cuttings into the crushing machine 100 for processing. The channel 102 may be supported by a flexible support arm 103 affixed to a base 116. The flexible support arm 103 may be raised and lowered in the +/−Z direction to allow the channel 102 to receive a mixture containing at least drilling fluid and cuttings from the shaker. Subsequently, the mixture is introduced into the inlet 104 of the crushing machine 100.

Figure 2A:
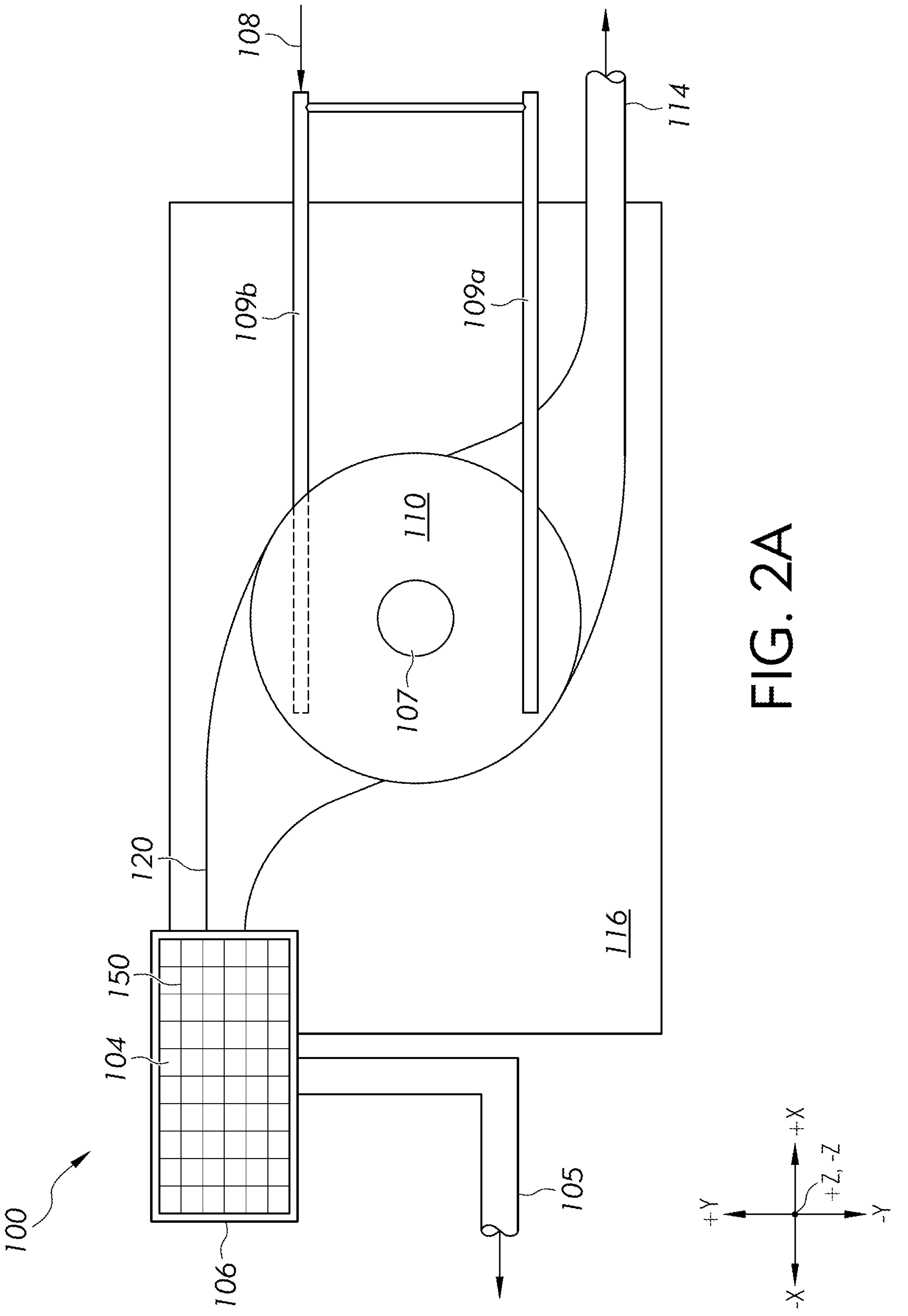
FIG. 2A schematically depicts a top view of a single stage of a crushing machine, according to one or more embodiments herein.
Figure 2B:
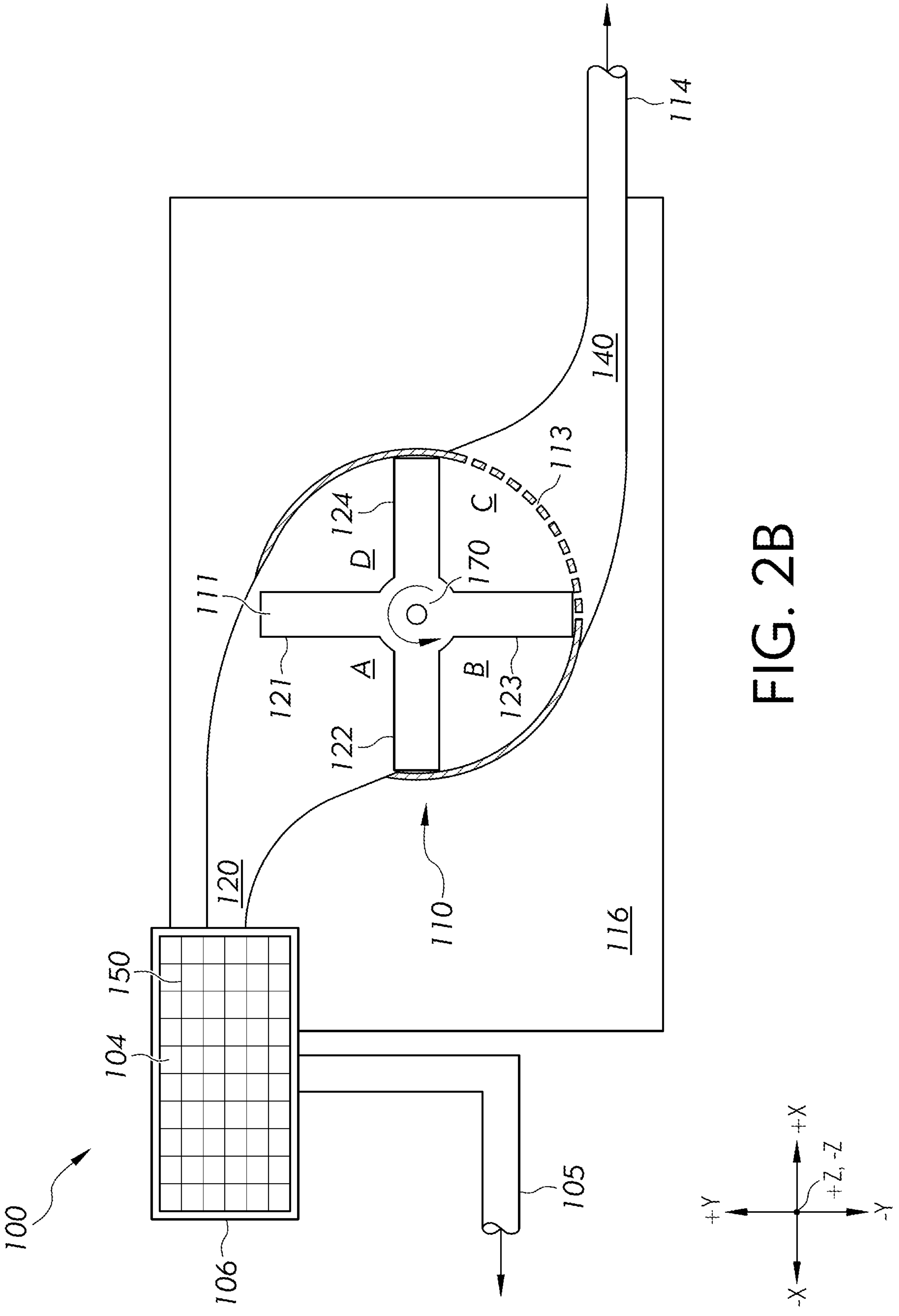
FIG. 2B schematically depicts a top view of a single stage of a crushing machine, according to one or more embodiments herein.

Now referring to FIGS. 2A and 2B, the inlet 104 includes a metallic mesh 150 and a fluid catch pan 106 that is fluidly coupled to a pipe 105. The metallic mesh 150 may be a size 4-mesh, meaning there are four holes across one linear inch of screen. This size will prevent the cuttings that require crushing from going into the return pipe 105. Instead, the drilling fluid and any small material that did not completely separate in the shaker will be filtered to a mud tank (FIG. 4) through the pipe 105. The cuttings that are too large to fall through the metallic mesh 150 are fed into the crushing machine via channel 120.

Channel 120 is in fluid communication with a first stage comprising a first housing 110 of the crushing machine 100. As depicted in FIG. 2B, the first housing 110 includes four chambers A. B. C. and D, and the first housing 110 also includes a first rotating hammer 111 that has four blades, 121, 122, 123, and 124. It is contemplated that the first housing 110 could include a first rotating hammer 111 with a plurality of blades and chambers and is not limited to four.

The cuttings in channel 120 may be gravity-fed to the first housing 110, where the first rotating hammer 111 traps some cuttings in chamber A between blades 121 and 122. A first rotating hammer head 170 spins on an axis, powered by an electric motor 107 that turns shaft 117 (FIG. 3), which in turn rotates the first rotating hammer head 170 and the blades 121, 122, 123, and 124 on the first rotating hammer 111. In an example, the axis is vertical (+/−Z direction) and the hammer head 170 spins counter-clockwise. The motor may be capable of producing 3.7 kW and 5 hP.

As the first rotating hammer 111 spins, cuttings are fed into each of chamber A, B, C. and D. When each chamber, comprising cuttings, rotates to the position of Chamber C in FIG. 2B, the blades striking the cuttings cause the cuttings to be ground against a first grate plate 113, which is affixed to the first housing 110. This repeated striking of the cuttings between the rotating blades 121, 122, 123, and 124 and the first grate plate 113 causes the cuttings to be ground into smaller particles that eventually flow through the first grate plate 113. The first grate plate 113 may have a size of 3 mm. As such, once the cuttings are smaller than the size of the holes in the first grate plate 113, the reduced-in-size cuttings may pass through the first grate plate 113.

Also facilitating the crushing and flow of the cuttings in the first housing 110 is a first water injector 109*a*. The first water injector 109*a* is fluidly coupled to the first housing 110, and the first water injector 109*a* may have a pump or water supply 108 that continuously pumps water into the first housing 110. The first water injector 109*a* allows the crushed cuttings to mix with water to form a cuttings mixture 131 that continues to flow out of the first housing 110 and into a second channel 130 (FIG. 3), which is in fluid communication with a second stage comprising a second housing 112.

Figure 3:
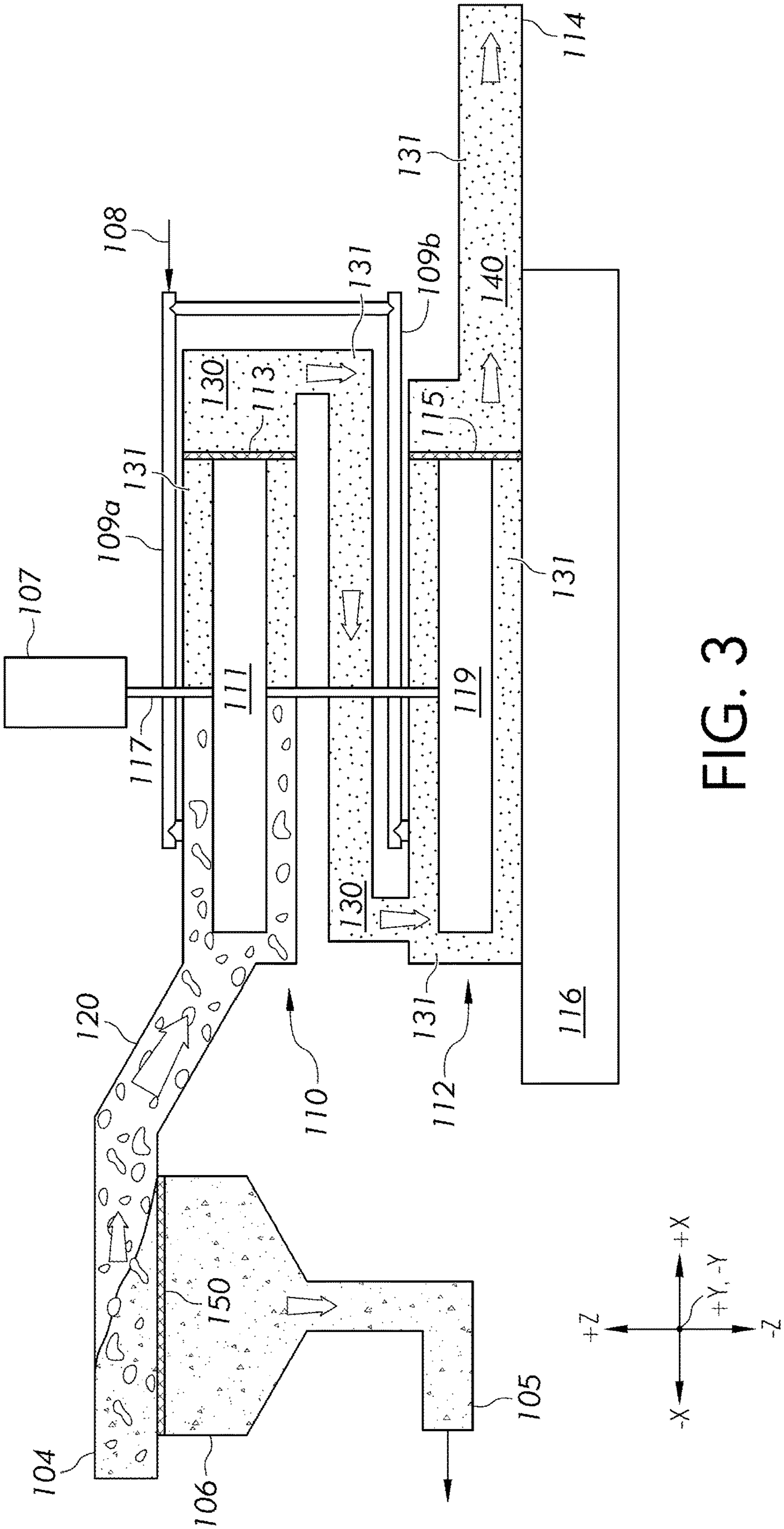
FIG. 3 schematically depicts a side view of a two-stage crushing machine, according to one or more embodiments herein.

Referring now to FIG. 3, the cuttings mixture 131 enters the second housing 112 from the second channel 130. The second housing 112 is substantially similar to the first housing 110, as depicted in FIG. 2B. The second housing 112 comprises a second rotating hammer 119 that rotates on an axis, such as an, powered by the electric motor 107 that turns the shaft 117. The second rotating hammer 119 may also comprise a plurality of chambers and blades. The second water injector 109*b* is fluidly coupled to the second housing 112, and the second water injector 109*b* may have a pump or water supply 108 that continuously pumps water into the second housing 112. The second water injector 109*b* allows the crushed cuttings to mix with water to continue to form the cuttings mixture 131 that flows out of the second housing 112 and into an outlet channel 140.

When the cuttings mixture 131 is introduced to the second housing 112, the cuttings in the cuttings mixture 131 have already been reduced in size from the first stage in the crushing machine 100. The reduced-in-size cuttings are crushed again into fine particles in the second stage by the second rotating hammer 119 and the second grate plate 115. The mechanism by which the second rotating hammer 119 and the second grate plate 115 grind the cuttings to smaller sizes is substantially the same as the mechanism by which the first rotating hammer 111 and the first grate plate 113 reduces the cuttings in size. The second grate plate 115 may have a smaller hole size than the first grate plate 113 to allow the fine particles to exit the second housing 112 to the outlet channel 140. For example, the second grate 115 may have a hole size of 2 mm.

The fine particles in the cuttings mixture 131 are transported from the outlet channel 140 to an outlet pipe 114, where the cuttings mixture 131 is delivered to a waste pit. Once the fine particles are in the waste pit, the fine particles may be retrieved by vacuum tankers (FIG. 4) now that cuttings are small enough to be vacuumed up. These vacuum tankers will then transport the mud and fine particles for disposal or treatment (FIG. 4).

Figure 4:
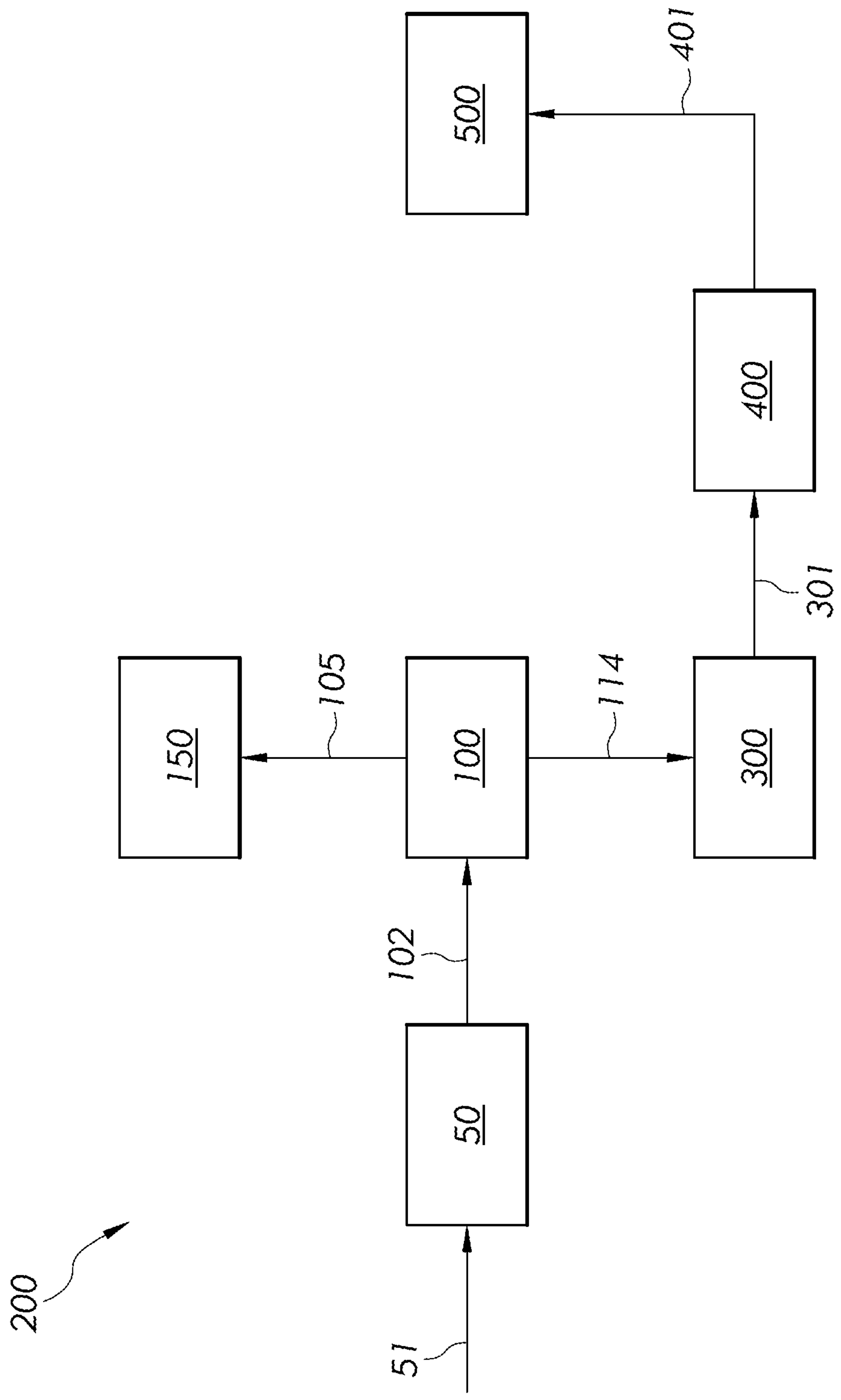
FIG. 4 depicts a block-flow diagram of an example system comprising a crushing machine, according to one or more embodiments shown and described herein.

Now referring to FIG. 4, a block-flow diagram of the system including the crushing machine is shown. A raw material mixture including at least cuttings and drilling fluid enters the shaker 50 through an inlet 51, where the shaker 50 vibrates such that the cuttings are at least partially separated from the raw material mixture to form a feed. The feed comprises a greater ratio of cuttings to drilling fluid in comparison to the raw material mixture.

The feed is delivered to a crushing machine 100 through a channel 102. Once the feed enters the crushing machine 100, small cuttings and other parts of the fluid still in the feed may be transported to a mud tank 150 through pipe 105.

At the same time, the feed which is not transported to the mud tank 150 through pipe 105 is introduced into the stages of the crushing machine 100. After the feed is crushed to form fine particles according to methods described herein, the fine particles are delivered to the waste pit 300 through an outlet pipe 114.

Once all cuttings have been crushed into fine particles, a vacuum tanker 400 may retrieve the mud and fine particles in the waste pit through a vacuum line 301. The vacuum tanker 400 may then transfer the mixture of drilling fluid and fine particles to a disposal site or a treatment plant 500 directly or through intermediate means 401, such as by rail. The crushed cuttings separated from the drilling fluid may undergo advanced treatment methods, like thermal desorption, to remove contaminants. Alternatively, cuttings can be re-purposed for uses such as land reclamation or construction. Ultimately, the crushed cuttings are able to be disposed of and/or re-used after being vacuumed with the fluid. The ability to vacuum the cuttings eliminates other more costly methods of disposal requiring a separate process for retrieving the cuttings from the waste pit 300.

The present disclosure includes multiple aspects. A first aspect is a method of reducing the size of cuttings from a drilling operation to fine particles, the method comprising: obtaining a mixture, the mixture comprising at least cuttings and drilling fluid; separating cuttings from the mixture to form a feed such that the feed comprises a greater ratio of cuttings to drilling fluid in comparison to the mixture; providing a crushing machine, comprising; an inlet; a first stage, wherein the first stage comprises: a first housing; a first rotating hammer disposed within the first housing, the first rotating hammer comprising a plurality of blades, wherein the first rotating hammer spins on an axis powered by a motor; a first grate plate affixed to the first housing; and a first water injector coupled to the first housing; a second stage, wherein the second stage comprises: a second housing; a second rotating hammer disposed within the second housing, the second rotating hammer comprising a plurality of blades, wherein the second rotating hammer spins on an axis powered by the motor; a second grate plate affixed to the second housing; and a second water injector coupled to the second housing; delivering the feed to the inlet, wherein the inlet comprises a channel coupled to the first stage and a mesh; draining at least a portion of the drilling fluid from the feed through the mesh and delivering the drained drilling fluid to a mud tank; delivering the cuttings to the first stage of the crushing machine through the channel; crushing the cuttings with the first rotating hammer to form reduced-size cuttings; injecting water into the first housing via the first water injector thereby flowing the reduced-size cuttings through the first grate plate toward the second stage of the crushing machine; crushing the reduced size cuttings with the second rotating hammer such that the reduced size cuttings are further reduced in size to become fine particles; injecting water into the second housing through the second water injector to cause the fine particles to flow through an outlet; flowing the fine particles to a waste pit.

A second aspect of the present disclosure may include the first aspect, wherein the drilling fluid comprises one or more of sodium, barium sulfate, and calcium.

A third aspect may include any of the previous aspects, wherein the step of separating cuttings from the mixture comprises vibrating a shaker such that the cuttings are at least partially separated from the mixture to form a feed such that the feed comprises a greater ratio of cuttings to drilling fluid in comparison to the mixture.

A fourth aspect may include the third aspect, wherein the channel coupled to the first stage and the mesh is supported by a flexible support arm such that the channel is adjustable in the vertical direction to receive a feed from the shaker.

A fifth aspect may include the third aspect, wherein the shaker has a mesh size of 4-mesh.

A sixth aspect is a method of vacuuming mud and fine particles from a waste pit, the method comprising: providing a vacuum tanker; reducing the size of cuttings in accordance of the method of the first aspect; vacuuming a fluid from the waste pit, the fluid comprising the fine particles; and transporting the fluid to a treatment plant or disposal site.

A seventh aspect may include any of the previous aspects, wherein the cuttings contain hydrocarbons.

An eighth aspect may include any of the previous aspects, wherein the motor is a 3.7 kW and 5 hP motor.

A ninth aspect may include any of the previous aspects, wherein the grate plate of the of the first housing has a hole size of 3 mm.

A tenth aspect may include any of the previous aspects, wherein the grate plate of the of the second housing has a hole size of 2 mm.

An eleventh aspect may include any of the previous aspects, wherein the first rotating hammer comprises at least four blades.

A twelfth aspect may include any of the previous aspects, wherein the second rotating hammer comprises at least four blades.

A thirteenth aspect may include any of the previous aspects, wherein the drilling fluid in the mud tank is treated for re-use in drilling operations.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including."

It should be understood that where a first component is described as "comprising" a second component, it is contemplated that, in some embodiments, the first component "consists" or "consists essentially of" that second component.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition should be appreciated as containing, in some embodiments, a mixture of isomers of that constituent. In additional embodiments, the chemical compounds may be present in alternative forms such as derivatives, salts, hydroxides, etc.

It is also noted that recitations herein of "at least one" component, element, etc., should not be used to create an inference that the alternative use of the articles "a" or "an" should be limited to a single component, element, etc.

What is claimed is:

1. A method of reducing the size of cuttings from a drilling operation to fine particles, the method comprising:
- obtaining a mixture, the mixture comprising at least cuttings and drilling fluid;
- separating cuttings from the mixture to form a feed such that the feed comprises a greater ratio of cuttings to drilling fluid in comparison to the mixture;
- providing a crushing machine, comprising;
  - an inlet;
  - a first stage, wherein the first stage comprises:
    - a first housing;
    - a first rotating hammer disposed within the first housing, the first rotating hammer comprising a plurality of blades, wherein the first rotating hammer spins on an axis powered by a motor;
    - a first grate plate affixed to the first housing; and
    - a first water injector coupled to the first housing;
  - a second stage, wherein the second stage comprises:
    - a second housing;
    - a second rotating hammer disposed within the second housing, the second rotating hammer comprising a plurality of blades, wherein the second rotating hammer spins on an axis powered by the motor;
    - a second grate plate affixed to the second housing; and
    - a second water injector coupled to the second housing;
- delivering the feed to the inlet, wherein the inlet comprises a channel coupled to the first stage and a mesh;
- draining at least a portion of the drilling fluid from the feed through the mesh and delivering the drained drilling fluid to a mud tank;
- delivering the cuttings to the first stage of the crushing machine through the channel;
- crushing the cuttings with the first rotating hammer to form reduced-size cuttings;
- injecting water into the first housing via the first water injector thereby flowing the reduced-size cuttings through the first grate plate toward the second stage of the crushing machine;
- crushing the reduced size cuttings with the second rotating hammer such that the reduced size cuttings are further reduced in size to become fine particles;
- injecting water into the second housing through the second water injector to cause the fine particles to flow through an outlet;
- flowing the fine particles to a waste pit.

2. The method of claim 1, wherein the drilling fluid comprises one or more of sodium, barium sulfate, and calcium.

3. The method of claim 1, wherein the step of separating cuttings from the mixture comprises vibrating a shaker such that the cuttings are at least partially separated from the mixture to form a feed such that the feed comprises a greater ratio of cuttings to drilling fluid in comparison to the mixture.

4. The method of claim 3, wherein the channel coupled to the first stage and the mesh is supported by a flexible support arm such that the channel is adjustable in the vertical direction to receive a feed from the shaker.

5. The method of claim 3, wherein the shaker has a mesh size of 4-mesh.

6. A method of vacuuming mud and fine particles from a waste pit, the method comprising:

providing a vacuum tanker;

reducing the size of cuttings in accordance of the method of claim 1;

vacuuming a fluid from the waste pit, the fluid comprising the fine particles; and transporting the fluid to a treatment plant or disposal site.

7. The method of claim 1, wherein the cuttings contain hydrocarbons.

8. The method of claim 1, wherein the motor is a 3.7 kW and 5 hP motor.

9. The method of claim 1, wherein the grate plate of the of the first housing has a hole size of 3 mm.

10. The method of claim 1, wherein the grate plate of the of the second housing has a hole size of 2 mm.

11. The method of claim 1, wherein the first rotating hammer comprises at least four blades.

12. The method of claim 1, wherein the second rotating hammer comprises at least four blades.

13. The method of claim 1, wherein the drilling fluid in the mud tank is treated for re-use in drilling operations.

* * * * *